(12) United States Patent
Axelson et al.

(10) Patent No.: US 11,486,589 B2
(45) Date of Patent: Nov. 1, 2022

(54) AIR TREATMENT DEVICE ADAPTED TO TREAT AIR IN A CONFINED SPACE

(71) Applicant: Blueair AB, Stockholm (SE)

(72) Inventors: Carl Johan Anton Axelson, Stockholm (SE); Christian Engene, Stockholm (SE); Simon Andreas Fredriksson, Stockholm (SE); Marie Charlotte Ideström, Stockholm (SE); Carl Fredrik Nilsson, Stockholm (SE); Carl Fredrik Victorin, Vaxholm (SE)

(73) Assignee: Blueair AB, Stockholm (SE)

( * ) Notice: Subject to any disclaimer, the term of this patent is extended or adjusted under 35 U.S.C. 154(b) by 357 days.

(21) Appl. No.: 16/652,542

(22) PCT Filed: Oct. 1, 2018

(86) PCT No.: PCT/EP2018/076671
§ 371 (c)(1),
(2) Date: Mar. 31, 2020

(87) PCT Pub. No.: WO2019/068652
PCT Pub. Date: Apr. 11, 2019

(65) Prior Publication Data
US 2020/0240653 A1 Jul. 30, 2020

(30) Foreign Application Priority Data
Oct. 2, 2017 (SE) .................... 1751216-1

(51) Int. Cl.
*F24F 1/0353* (2019.01)
*F24F 13/20* (2006.01)
(Continued)

(52) U.S. Cl.
CPC ......... *F24F 1/0353* (2019.02); *B60H 3/0071* (2013.01); *F24F 1/035* (2019.02);
(Continued)

(58) Field of Classification Search
CPC .. B03C 3/155; F24F 8/108; F24F 1/035; F24F 1/0328; F24F 1/0353; B60H 3/0071
See application file for complete search history.

(56) References Cited

U.S. PATENT DOCUMENTS

| 4,473,382 | A | * | 9/1984 | Cheslock | F24F 8/192 361/231 |
| 6,582,192 | B2 | * | 6/2003 | Tseng | F04D 29/54 415/211.1 |

(Continued)

FOREIGN PATENT DOCUMENTS

| CN | 1347344 | 5/2002 |
| CN | 101277724 | 10/2008 |

(Continued)

OTHER PUBLICATIONS

Search Report and Written Opinion in PCTEP2018076671; dated Jan. 16, 2019.

*Primary Examiner* — Schyler S Sanks
(74) *Attorney, Agent, or Firm* — Carter, DeLuca & Farrell LLP; George Likourezos

(57) ABSTRACT

The present inventive concept relates to an air treatment device adapted to treat air in a confined space. The air treatment device comprises a device body having a central axis, the device body comprising a supporting structure being substantially transverse to the central axis and a side section being substantially parallel to the central axis. The air treatment device further comprises an air treatment section arranged in the device, an ionizing arrangement, a fan arrangement, and a filter extending in a first direction being parallel to the central axis, wherein the filter comprises an upper end and a lower end in the first direction, wherein the ionizing arrangement and the fan arrangement are arranged between the upper and lower end.

9 Claims, 4 Drawing Sheets

(51) Int. Cl.
  *F24F 13/28* (2006.01)
  *F24F 1/0328* (2019.01)
  *F24F 1/035* (2019.01)
  *B60H 3/00* (2006.01)
  *F24F 8/30* (2021.01)
  *F24F 8/108* (2021.01)
  *F24F 8/192* (2021.01)

(52) U.S. Cl.
  CPC ............ *F24F 1/0328* (2019.02); *F24F 13/20* (2013.01); *F24F 13/28* (2013.01); *F24F 8/108* (2021.01); *F24F 8/192* (2021.01); *F24F 8/30* (2021.01)

(56) References Cited

U.S. PATENT DOCUMENTS

| | | | |
|---|---|---|---|
| 7,537,647 B2 | 5/2009 | Adair et al. | |
| 2004/0094344 A1 | 5/2004 | Flick | |
| 2007/0180801 A1* | 8/2007 | Paterson | F24F 8/192 55/471 |
| 2010/0067884 A1* | 3/2010 | Schedivy | B60N 2/64 386/E5.064 |
| 2016/0022857 A1* | 1/2016 | Esses | A61L 9/032 392/390 |

FOREIGN PATENT DOCUMENTS

| | | | |
|---|---|---|---|
| CN | 203036775 | 7/2013 | |
| CN | 103736348 | 4/2014 | |
| CN | 204345863 | 5/2015 | |
| CN | 104841558 | 8/2015 | |
| CN | 204701421 | 10/2015 | |
| CN | 105922846 | 9/2016 | |
| CN | 106140474 | 11/2016 | |
| DE | 29501947 | 3/1995 | |
| DE | 102012006968 | 11/2012 | |
| EP | 0980290 | 11/2005 | |
| EP | 2908064 | 8/2015 | |
| EP | 3056364 | 8/2016 | |
| EP | 3056364 A1 * | 8/2016 | ............... B03C 3/06 |
| EP | 3093564 | 11/2016 | |
| ES | 9804475 | 6/2000 | |
| SE | 521721 | 12/2003 | |
| WO | WO0061293 | 10/2020 | |

* cited by examiner

AIR TREATMENT DEVICE ADAPTED TO TREAT AIR IN A CONFINED SPACE

TECHNICAL FIELD

The inventive concept described herein generally relates to the field of air treatment devices. In particular, the present inventive concept relates to air treatment devices adapted to treat air in a confined space.

BACKGROUND

Air quality in vehicle cabins is an increasing concern due to high air pollution levels, in particular in large cities. Air to be delivered to the cabin is normally filtered in order to decrease the number of hazardous particles in the air. There exist systems for filtering air inside of a cabin of a vehicle. However, there is a need for improved air treatment devices adapted to treat air in a confined space, in particular compact air treatment devices having similar or increased effectivity with respect to existing air treatment systems.

SUMMARY OF THE INVENTION

It is an object of the present inventive concept to mitigate, alleviate or eliminate one or more of the above-identified deficiencies in the art and disadvantages singly or in combination.

According to a first aspect of the inventive concept, these and other objects are achieved in full, or at least in part, by an air treatment device adapted to treat air in a confined space, the air treatment device comprising: a device body having a central axis, the device body comprising a supporting structure being substantially transverse to the central axis; a side section being substantially parallel to the central axis, a device body air inlet arranged along at least part of a circumference of the side section, and a device body air outlet arranged along at least part of a circumference of the side section; an air treatment section arranged in the device body between the device body air inlet and the device body air outlet, the air treatment section being configured to treat a flow of air drawn via the device body air inlet, the air treatment section comprising an ionizing arrangement, a fan arrangement for generating the flow of air from the device body air inlet to the device body air outlet, and a filter arranged along at least part of a circumference of the side section, the filter extending in a first direction being parallel to the central axis, wherein the filter comprises an upper end and a lower end in the first direction, wherein the ionizing arrangement is arranged upstream of the filter with respect to a direction of flow from the device body air inlet to the device body air outlet, and wherein the ionizing arrangement and the fan arrangement are arranged between the upper and lower end.

According to the first aspect, a compact air treatment device is provided. Hereby, the air treatment device may be mounted in a confined space, such as a cabin of a vehicle.

Further, having the device body air inlet and device body air outlet arranged along at least part of a circumference of the side section provides for that a top section of the device body, being substantially perpendicular to the central axis, can be covered without impacting the efficiency of the air treatment device. This may be advantageous if the air treatment device is mounted on a center console of a vehicle, since it allows a driver and/or a passenger of the vehicle to rest his or her arm on the top section of the air treatment device. It may also be possible to place objects on top of the air treatment device without impacting the efficiency of the air treatment device.

Further, having the filter arranged along at least part of a circumference of the side section allows a surface area of the filter to be high while maintaining a compact air treatment device, and in particular while maintaining a compact air treatment device with respect to the first direction.

When the ionizing arrangement is in use, a voltage may be applied over an emitter electrode and a collector electrode, whereby an electric field is obtained between the emitter electrode and the collector electrode. Corona discharges occur at the emitter electrode, whereby molecules in the air get charged (ionized) and turn into ions. The ions travel in the electric field towards the collector electrode and collide with particles present in the air flow conducted by the collector electrode, whereby these particles get charged (ionized). In the present disclosure, the term "ionization field" will be used to indicate the field between the collector electrode and the emitter electrode where particles can be charged. The voltage applied over the emitter electrode and the collector electrode and the dimensions of the electrodes may preferably be adapted such that a major part of the particles that has been charged passes (are transmitted by) the collector electrode (instead of adhering to the collector electrode) and continues to travel to the filter a, where at least some of the charged particles may adhere to a filter media of the filter arrangement.

The filter and the device body air outlet may extend substantially the same distance in the first direction. Hereby, a surface area of the filter may be kept large while maintaining a compact air treatment device.

The device body air inlet may be arranged below the device body air outlet with respect to the first direction. Hereby, a compact air treatment device may be provided.

The air treatment section may comprise a fan arrangement inlet having an annular opening being substantially transverse to the central axis. Hereby, an efficient flow of air from the device body air inlet to the device body air outlet may be provided.

The ionizing arrangement may comprise a collector electrode and an emitter electrode, wherein the collector electrode is arranged along a circumference of the annular opening of the fan arrangement inlet and wherein the emitter electrode is arranged in a center of the annular opening of the fan arrangement inlet. Hereby, a compact air treatment device may be provided The annular opening of the fan arrangement inlet may be circular.

As the fan arrangement inlet is annular, and the emitter electrode is arranged in a center of the annular opening of the fan arrangement inlet, and the collector electrode is arranged along a circumference of the annular opening of the fan arrangement inlet, a uniform distance from the emitter electrode to the collector electrode is provided, which in turn provides a uniform ionization field, whereby the charging of particles passing the ionizing arrangement is enhanced. Hence, more particles present in the air flow gets charged, which in turn increases the number of particles adhering to the filter, whereby the air in the confined space gets cleaner.

In the present disclosure, the term "annular" may include shapes with a generally circular outline of its cross-section. The diameter of the annular opening of the fan arrangement inlet may vary along the central axis.

A filter medium if the filter may include a dielectric material, such as polypropylene. Dielectric fibrous material may attract charged particles even if it is not pre-charged. When charged particles come close to the fibers of the dielectric filter medium, a polarization of the molecules of the fibers takes place. For example, if a particle having a positive charging comes close to a filter fiber, the molecule polarization gives an induced negative charge on the surface of the fiber. A fiber that comprises several such polarized molecules will have a negative side and a positive side. Charged particles that pass through the filter unit, after such charges have been induced upon the surfaces of the fibers, will adhere to the fibers. This process is described in more detail in EP 0980290 B1 by the same applicant, which is hereby incorporated by reference.

The device body air inlet may be arranged to allow a flow of air radially inwards, wherein the fan arrangement inlet is arranged to allow a flow of air axially upwards, and wherein the device body air outlet is arranged to allow a flow of air radially outwards, with respect to the central axis. Hereby, a compact air treatment device is provided. In contrast, conventional air treatment devices often direct air linearly along a single direction, thus requiring an air treatment device extending predominantly in the single direction.

The air treatment device may extend less than 150 mm in the first direction, such as 100 mm.

The air treatment device may be configured to be mounted on a headrest of a seat in a vehicle.

The air treatment device may be configured to be mounted on a center console of a vehicle.

The air treatment device may be configured to be retrofitted on a headrest and/or a center console of a vehicle.

The air treatment device may be configured to be powered via an automobile accessory power outlet. The air treatment device may be configured to be powered via a power outlet of a vehicle. The power outlet and/or automobile accessory power outlet may be arranged within a cabin of a vehicle. Hereby, a simple power solution is provided e.g. when the air treatment device is mounted within the cabin of a vehicle.

The air treatment device may be configured to be controlled via a user interface arranged on a power receiver configured to connect to the automobile accessory power outlet. Hereby, a simple user interface for controlling an operation of the air treatment device is provided. The user interface may provide for that a blind operation of the air treatment device can be achieved. This may be advantageous in a driving situation of a vehicle, since it allows a user to keep his or her eyes on the road while controlling the air treatment device.

A feature described in relation to one aspect may also be incorporated in other aspects, and the advantage of the feature is applicable to all aspects in which it is incorporated.

Other objectives, features and advantages of the present inventive concept will appear from the following detailed disclosure, from the attached claims as well as from the drawings.

Generally, all terms used in the claims are to be interpreted according to their ordinary meaning in the technical field, unless explicitly defined otherwise herein. Further, the use of terms "first", "second", and "third", and the like, herein do not denote any order, quantity, or importance, but rather are used to distinguish one element from another. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present inventive concept, will be better understood through the following illustrative and non-limiting detailed description of different embodiments of the present inventive concept, with reference to the appended drawings, wherein.

DETAILED DESCRIPTION

Throughout the present disclosure, the term "automobile accessory power outlet" may be interchangeably used with "power outlet of a vehicle"

Figure 1:
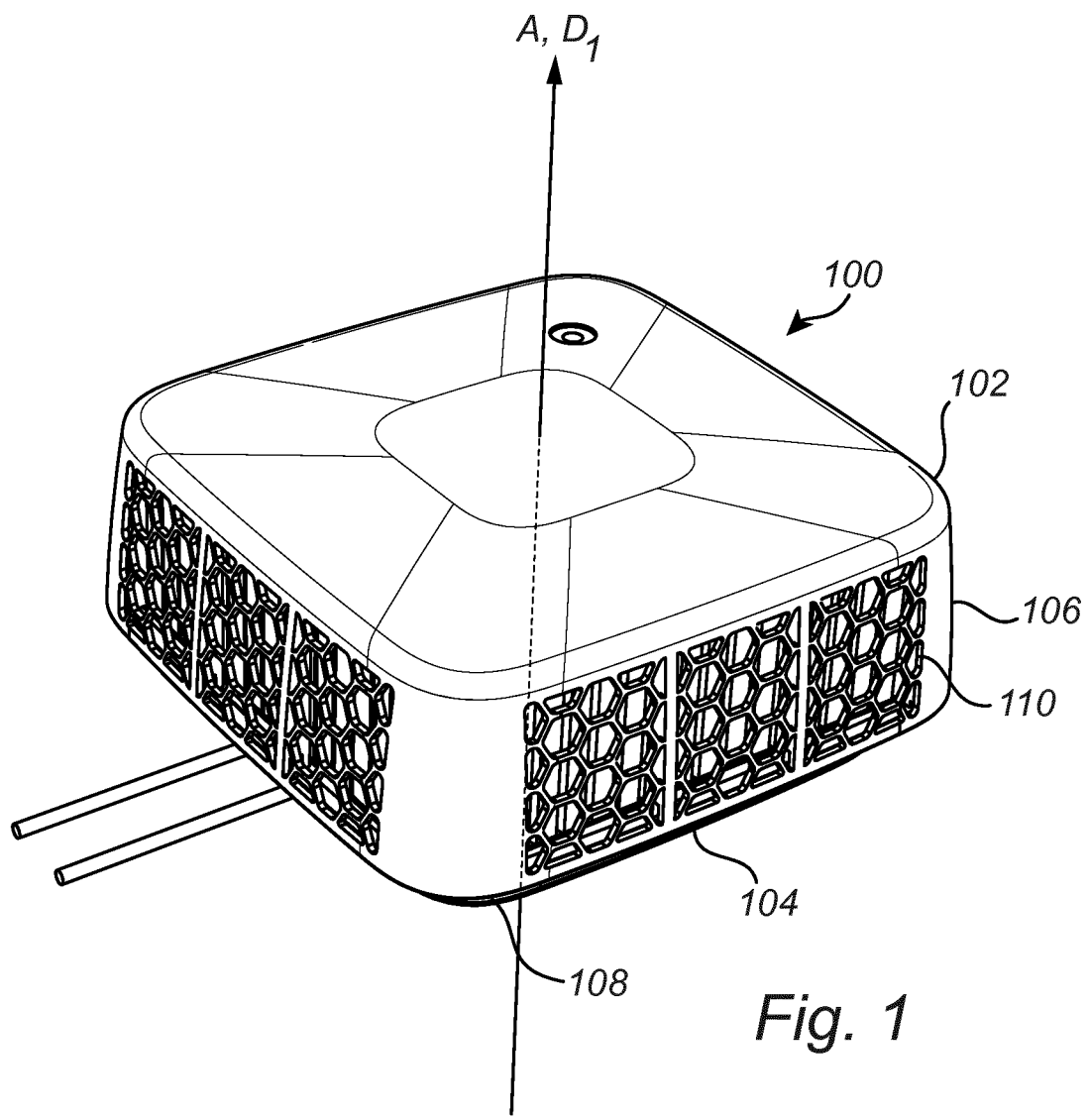
FIG. 1 illustrates a perspective view of an air treatment device.

An air treatment device 100 according to the inventive concept will be described with reference to FIG. 1, which illustrates a perspective view of the air treatment device 100. The air treatment device 100 comprises a device body 102 having a central axis A. The device body comprises a supporting structure 104 being substantially transverse to the central axis A. The device body 102 is here illustrated in the shape of a rectangular cuboid. However, it will be appreciated that other geometrical shapes may be envisaged within the scope of the inventive concept.

The device body 102 further comprises a side section 106 being substantially parallel to the central axis A. Here, the side section 106 encloses the central axis A, and thus defines an inner volume for housing other parts of the air treatment device 100.

Along at least part of a circumference of the side section 106, a device body air inlet 108 is arranged. The device body air inlet may be formed by a gap between the supporting structure 104 and the side section 106. The side section 106 may be arranged to extend further away from the central axis A as compared to the supporting structure 104. Hereby, the device body air inlet 108 may be at least partly hidden when the air treatment device is viewed from above.

Along at least part of a circumference of the side section 106, a device body air outlet 110 is arranged. The device body air outlet may be formed by an array of holes in the side section 106. The device body air outlet 110 is here arranged above the device body air inlet 108 with respect to a first direction $D_1$ being parallel to the central axis A.

Figure 2:
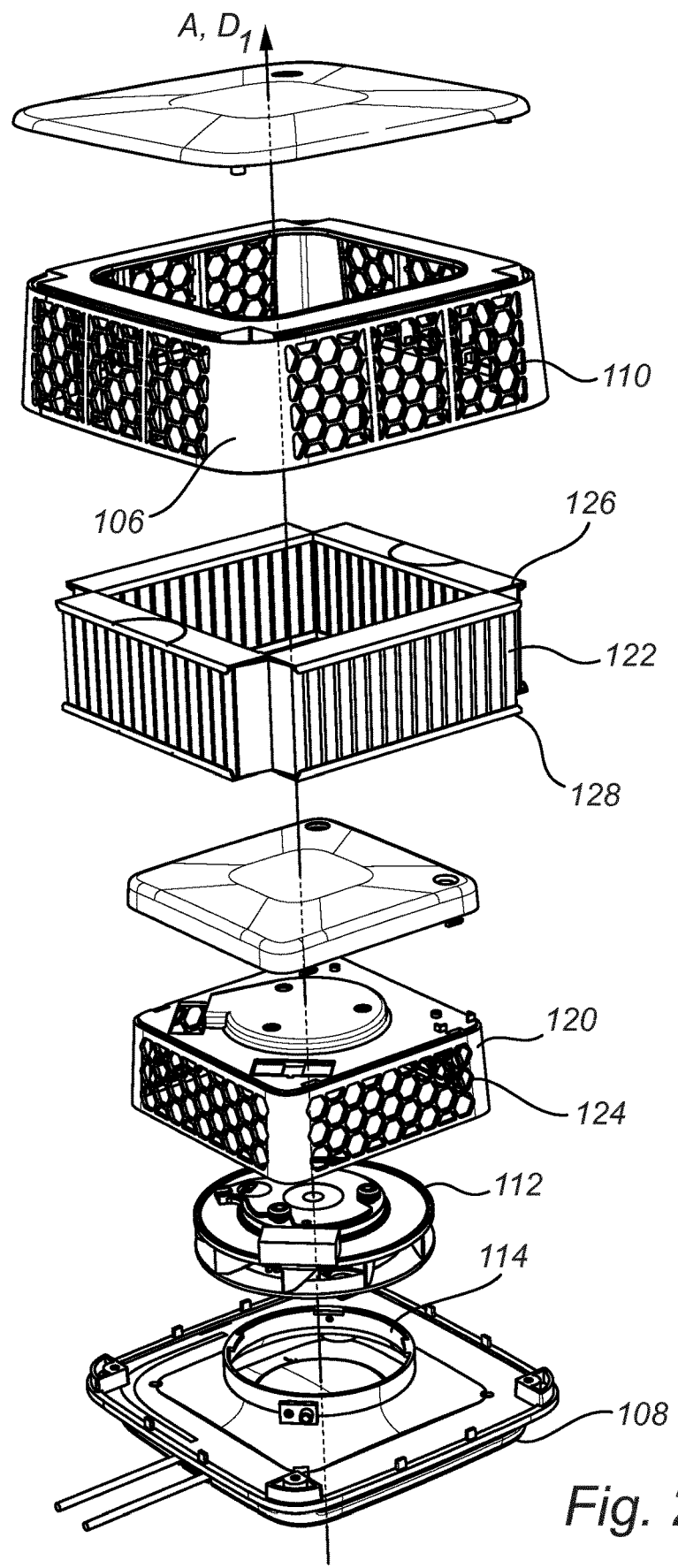
FIG. 2 illustrates an exploded view of an air treatment device.

Referring now to FIG. 2, the air treatment device 100 further comprises an air treatment section arranged in the device body 102 between the device body air inlet 108 and the device body air outlet 110. The air treatment section is configured to treat a flow of air drawn via the device body air inlet 108.

The air treatment section comprises a fan arrangement 112 for generating the flow of air from the device body air inlet 108 to the device body air outlet 110. The fan arrangement may comprise a fan unit configured to rotate around the central axis A. A fan arrangement inlet 114 may be arranged in the air treatment section. The fan arrangement inlet 114 here has an annular opening being substantially transverse to the central axis A.

The air treatment section comprises an ionizing arrangement (not shown). The ionizing arrangement (not shown) comprises a collector electrode (not shown) and an emitter electrode (not shown). The collector electrode is arranged along a circumference of the annular opening of the fan arrangement inlet 114 and, the emitter electrode is arranged in a center of the annular opening of the fan arrangement inlet 114. The emitter electrode may be arranged closer to a center of the annular opening than the collector electrode.

The fan arrangement 112 and the ionizing arrangement (not shown) is here enclosed by an inner body 120 having an inner body air outlet 124 arranged along at least part of a circumference of the inner body 120.

The air treatment section comprises a filter 122 arranged along at least part of a circumference of the side section 106. The filter 122 extends in the first direction $D_1$. The filter 122 comprises an upper end 126 and a lower end 128 in the first direction $D_1$. The ionizing arrangement is arranged upstream of the filter 122 with respect to a direction of flow from the device body air inlet 108 to the device body air outlet 110, and the ionizing arrangement and the fan arrangement 112 are arranged between the upper and lower end 126, 128. In other words, a periphery of the filter 122 may define imaginary limits along the central axis A, and the ionizing arrangement and the fan arrangement 112 may be arranged within the imaginary limits. Here, the filter 122 and the device body air outlet 110 extend substantially the same distance in the first direction $D_1$. The filter 122 may comprise a filter media being supported by a frame. It should be noted that because of the nature of an exploded view, the upper and lower end 126, 128 as well as the distance which the filter 122 and the device body air outlet 110 extend may not be accurately illustrated.

Figure 3:
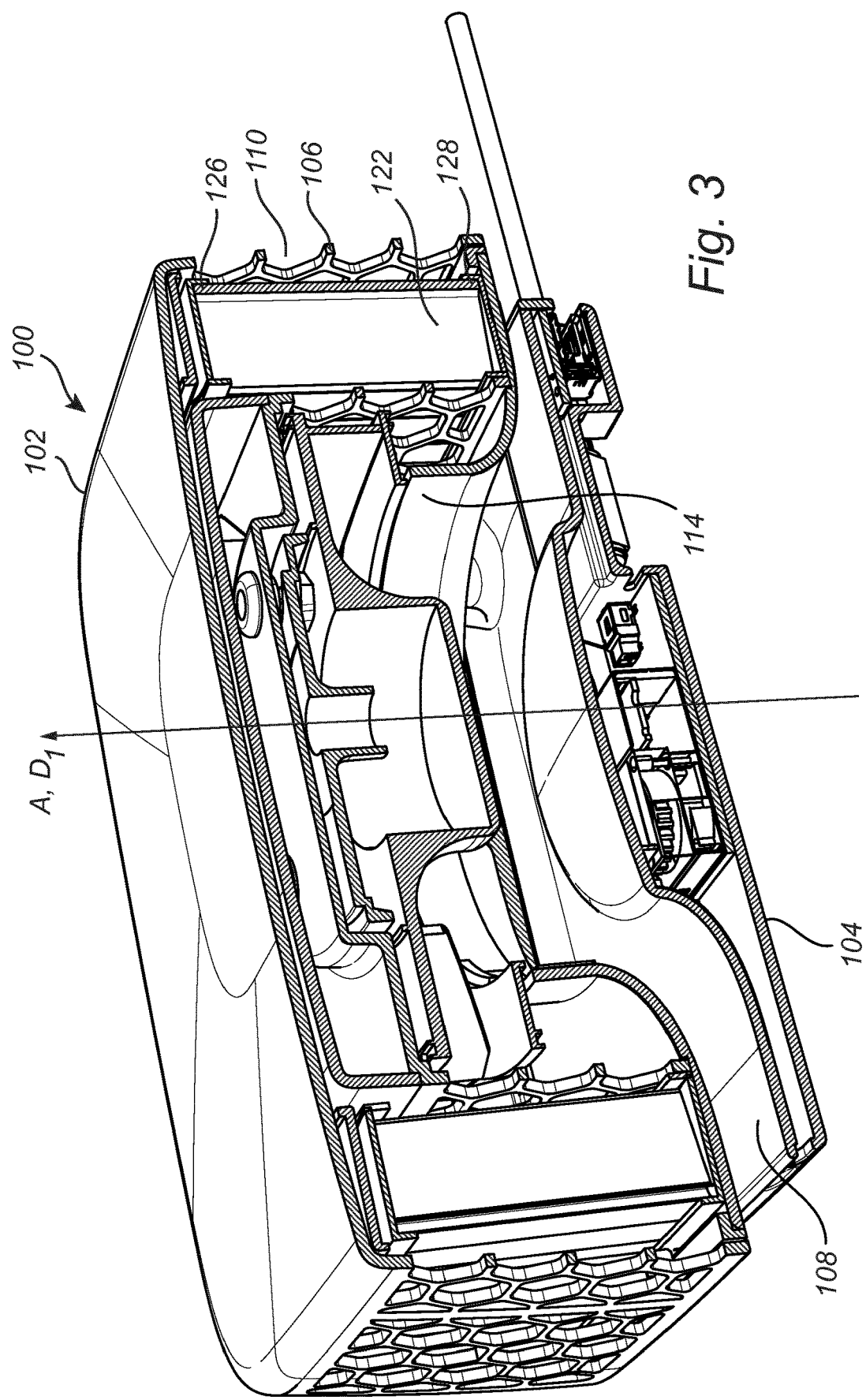
FIG. 3 illustrates a cross sectional view of an air treatment device.

Referring now to FIG. 3, a clearer view of the device body air inlet 108 can be seen. Further, the upper end 126 and lower end 128 of the filter 122 is here illustrated more clearly compared to FIG. 2. The fan arrangement and ionizing arrangement is arranged between the upper and lower end 126, 128. The device body 102 of the air treatment device 100 here comprises a top section being substantially parallel to the central axis. It may be noted that the device body air outlet 110 is here confined to the side section 106. Hereby, objects may be placed on the top section without impacting the efficiency and/or the air flow of the air treatment device. A clearer view of the supporting structure 104 can here also be seen.

Figure 4:
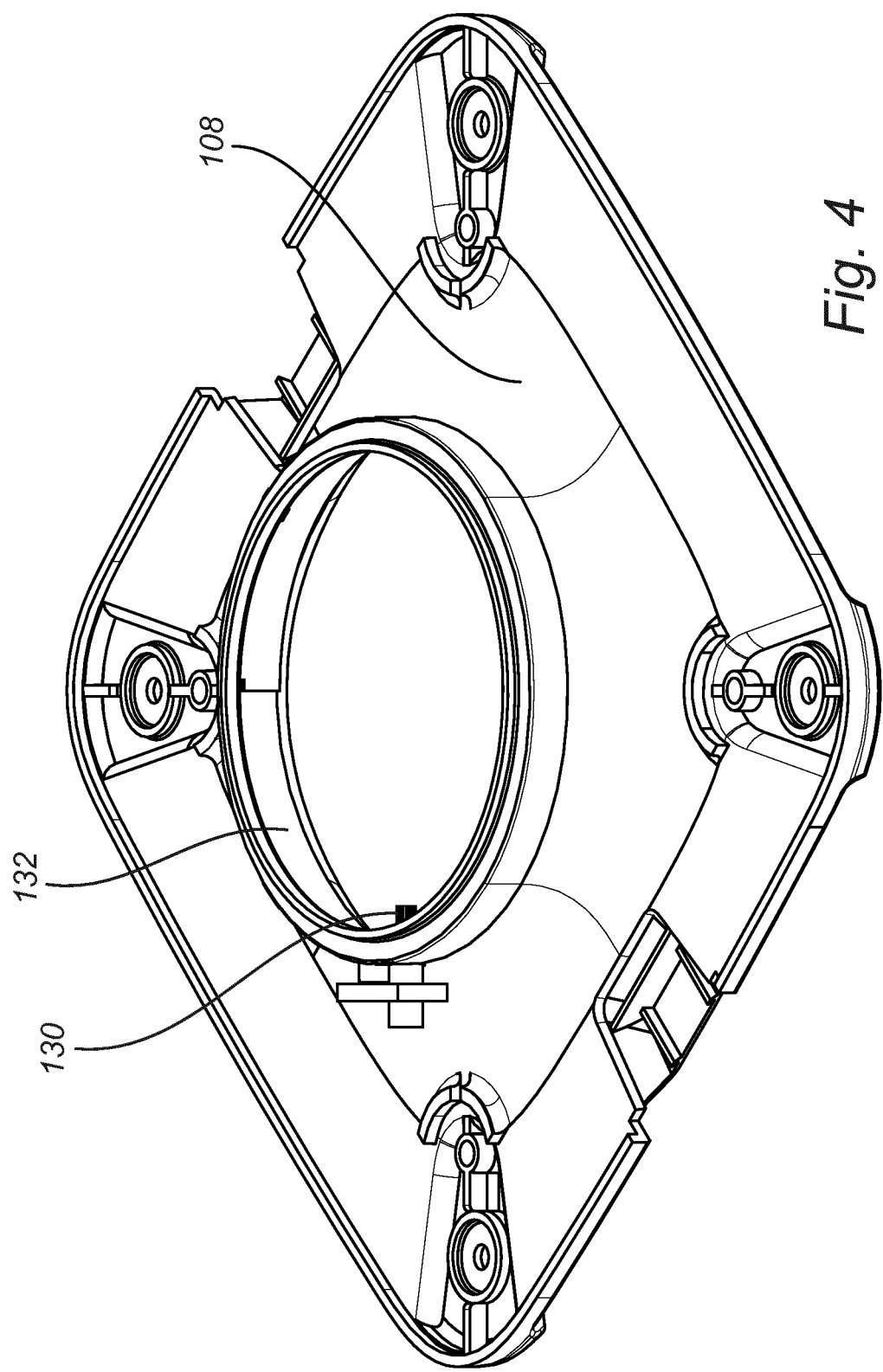
FIG. 4 illustrates a perspective view of a collector electrode and an emitter electrode.

Referring now to FIG. 4, the emitter electrode 130 and collector electrode 132 is shown as arranged on the fan arrangement inlet 114. Here, the emitter electrode 130 is an ionizing brush, and the collector electrode 132 is a grounding cylinder arranged along the circumference of the fan arrangement inlet 114. The device body air inlet 108 can also be seen in this view. It is to be understood that the emitter electrode 130 may protrude further towards the center of the fan arrangement inlet 114 than shown in this figure. Also, it is to be understood that the collector electrode 132 does not necessarily have to run along the full length of the circumference of the fan arrangement inlet 114.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

LIST OF REFERENCE SIGNS

100 Air treatment device
102 Device body
104 Supporting structure
106 Side section
108 Device body air inlet
110 Device body air outlet
112 Fan arrangement
114 Fan arrangement inlet
120 Inner body
122 Filter
124 Inner body air outlet
126 Upper end
128 Lower end
130 Emitter electrode
132 Collector electrode

The invention claimed is:

1. A portable air treatment device adapted to treat air in a confined space, the air treatment device comprising:
   a device body having a central axis, the device body comprising:
      a supporting structure being substantially transverse to the central axis;
      a side section being substantially parallel to the central axis,
      a device body air inlet arranged along at least part of a circumference of the side section, and
      a device body air outlet arranged along at least part of a circumference of the side section;
   an air treatment section arranged in the device body between the device body air inlet and the device body air outlet, the air treatment section being configured to treat a flow of air drawn via the device body air inlet, the air treatment section comprising:
      an ionizing arrangement,
      a fan arrangement for generating the flow of air from the device body air inlet to the device body air outlet, and
      a filter arranged along at least part of a circumference of the side section, the filter extending in a first direction being parallel to the central axis, wherein the filter comprises an upper end and a lower end in the first direction,
   wherein the ionizing arrangement is arranged upstream of the filter with respect to a direction of flow from the device body air inlet to the device body air outlet, and wherein the ionizing arrangement and the fan arrangement are arranged between the upper and lower end of the filter, wherein the air treatment section comprises a fan arrangement inlet having an annular opening being substantially transverse to the central axis, wherein the device body air inlet is arranged to allow a flow of air radially inwards, wherein the fan arrangement inlet is arranged to allow a flow of air axially upwards, and wherein the device body air outlet is arranged to allow a flow of air radially outwards, with respect to the central axis, and wherein the air treatment device is configured to be powered via an automobile accessory power outlet.

2. The air treatment device according to claim 1 wherein the filter and the device body air outlet extend substantially the same distance in the first direction.

3. The air treatment device according to claim 1 wherein the device body air inlet is arranged below the device body air outlet with respect to the first direction.

4. The air treatment device according to claim 1 wherein the ionizing arrangement comprises a collector electrode and an emitter electrode, wherein the collector electrode is arranged along a circumference of the annular opening of the fan arrangement inlet and wherein the emitter electrode is arranged in a center of the annular opening of the fan arrangement inlet.

5. The air treatment device according to claim 1 wherein the annular opening of the fan arrangement inlet is circular.

6. The air treatment device according to claim 1 wherein the air treatment device extends less than 150 mm in the first direction.

7. The air treatment device according to claim 1 wherein the air treatment device is configured to be mounted on a headrest of a seat in a vehicle.

8. The air treatment device according to claim 1 wherein the air treatment device is configured to be mounted on a center console of a vehicle.

9. The air treatment device according to claim 1 wherein the air treatment device is configured to be controlled via a user interface arranged on a power receiver configured to connect to the automobile accessory power outlet.

\* \* \* \* \*